(No Model.)

J. BRACK.
TRUCK.

No. 474,360. Patented May 10, 1892.

Fig. 3. Section 1-1.

WITNESSES:
John W. Fisher
John N. Mayer

INVENTOR,
John Brack
BY
Frederick W. Cameron
ATTORNEY.

THE NORRIS PETERS CO., PHOTO-LITHO., WASHINGTON, D. C.

UNITED STATES PATENT OFFICE.

JOHN BRACK, OF ALBANY, NEW YORK.

TRUCK.

SPECIFICATION forming part of Letters Patent No. 474,360, dated May 10, 1892.

Application filed February 10, 1892. Serial No. 420,930. (No model.)

*To all whom it may concern:*

Be it known that I, JOHN BRACK, a citizen of the United States, residing in the city and county of Albany, State of New York, have invented a new and useful Improvement in Trucks, of which the following is a specification.

My invention relates to improvements in two-wheeled vehicles usually propelled by hand; and the objects of my invention are to provide a truck which may be readily dumped to the rear without turning the handles toward the rear of the truck and which shall be accomplished in a simple manner and with the use of much less force than the same results can be accomplished by the use of any contrivance with which I am familiar. I accomplish these objects by means of the mechanism illustrated in the accompanying drawings, in which—

Figure 1:
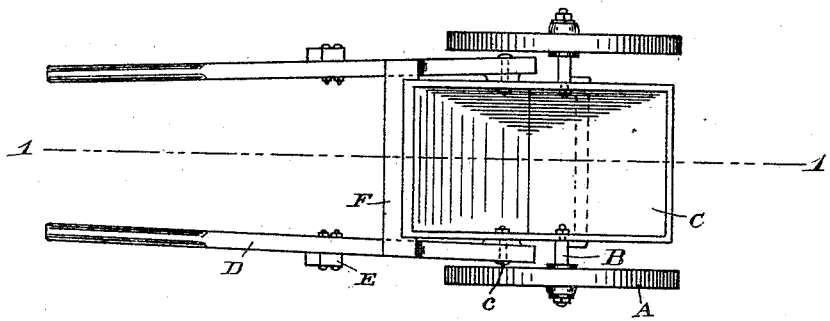
Figure 2:
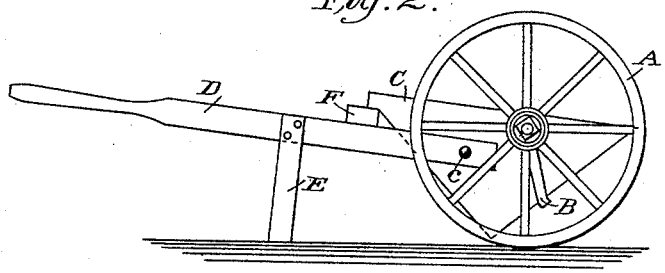
Figure 2:
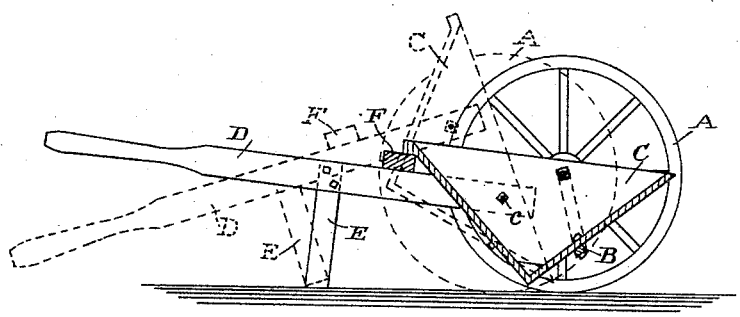

Figure 1 is a plan. Fig. 2 is a side elevation, and Fig. 3 is a longitudinal section through the lines 1 1 on Fig. 1.

Similar letters refer to similar parts throughout the several views.

The wheels A A are placed upon the axle B, upon which they revolve in the usual manner, being secured thereon by suitable nuts. The axle B after passing through the wheel A is connected with the box C by means of a bolt passing through the box, and is bent downward a short distance and then extends across the truck, where it is bent upward upon a line parallel with its opposite side and is again secured to the box C, and also forms a spindle for the other wheel. The box C is thus supported upon the axle B, and has secured to its forward side by means of the bolt c or in any suitable manner the handles D, the handle D being provided with a rest E, which is a bar connected to the handle between the box C and the opposite end of the handle and which extends downward, resting upon the ground when the vehicle is in its normal position, as shown by full lines in Fig. 3.

Extending across the handles and in connection with the forward portion of the box C, I place the brace F, which supports the handles with respect to each other and also acts as a support for the box C, which rests upon it.

The box C is preferably made, as shown in Fig. 3, triangular in form, the hypotenuse of the triangle being the mouth of the box and supported by the sides of the axle on each side of the box and across the rear side thereof. I do not, however, limit myself to this exact construction, since a different-shaped box would do and a straight axle might be used, passing through the box from one wheel to the other, or the axle might be bent within the box and extend downward parallel to its sides and across its bottom.

The operation of my truck is apparent at a glance. By pressing downward on the ends of the handles B the rest E acts as a fulcrum, the handles as a lever, and the box C as a weight. The box is tipped backward, as shown by dotted lines in Fig. 3, the contents of the box being dumped out to the rear.

My invention is extremely simple in its construction and operation and performs the work required of it in a positive and satisfactory manner.

What I claim as my invention, and desire to secure by Letters Patent, is—

1. In a truck, the combination of two wheels, an axle upon which said wheels revolve, a box secured to the axle between the wheels, handles attached to the forward portion of the box, and rests attached to the handles between the box and the ends of the handles in such a manner that by pressing downward on the ends of the handles the forward portion of the box will be raised and the rear portion caused to descend, substantially as described, and for the purpose set forth.

2. In a truck, the combination of two wheels, an axle upon which said wheels revolve, a triangular-formed box supported by said axle, handles attached to the forward portion of said box, and rests attached to the handles between the box and the ends of the handles in such a manner that by pressing downward on the ends of the handles said box will be tipped toward the rear, substantially as described, and for the purpose set forth.

JOHN BRACK.

Witnesses:
FREDERICK W. CAMERON,
WALTER E. WARD.